United States Patent
Lee et al.

(10) Patent No.: US 10,710,511 B2
(45) Date of Patent: Jul. 14, 2020

(54) APPARATUS FOR MOUNTING VEHICLE ROOF RACK

(71) Applicants: Hyundai Motor Company, Seoul (KR); Kia Motors Corporation, Seoul (KR)

(72) Inventors: Seung-Hwan Lee, Seoul (KR); Kwang-Jae Choi, Gyeonggi-do (KR); Jeong-Ho Lee, Gyeonggi-do (KR); Seung-Mok Lee, Gyeonggi-do (KR); Jin-Hyeok Cheon, Gyeongsangbuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/200,268

(22) Filed: Nov. 26, 2018

(65) Prior Publication Data
US 2019/0176713 A1   Jun. 13, 2019

(30) Foreign Application Priority Data
Dec. 13, 2017  (KR) .......................... 10-2017-0171033

(51) Int. Cl.
  B60R 9/00    (2006.01)
  B60R 9/058   (2006.01)
  F16B 21/09   (2006.01)
(52) U.S. Cl.
  CPC .............. B60R 9/058 (2013.01); F16B 21/09 (2013.01)
(58) Field of Classification Search
  CPC ................................. B60R 9/058; F16B 21/09
  USPC ........................................................ 224/309
  See application file for complete search history.

(56) References Cited

FOREIGN PATENT DOCUMENTS

KR        101393508 B1    5/2014

*Primary Examiner* — Peter N Helvey
(74) *Attorney, Agent, or Firm* — Mintz Levin Cohn Ferris Glovsky and Popeo, P.C.; Peter F. Corless

(57) ABSTRACT

An apparatus for mounting a vehicle roof rack, provided on a roof of a vehicle, includes a roof rack rail, a roof rack bolt fixed to the roof rack rail, a roof rack nut fastened to the roof rack bolt, a roof rack pad coupled to the roof rack rail, a spacer mounted to a roof panel of the vehicle, and an in-line nut for fixing the spacer.

20 Claims, 7 Drawing Sheets

APPARATUS FOR MOUNTING VEHICLE ROOF RACK

CROSS-REFERENCE TO RELATED APPLICATION(S)

This application claims under 35 U.S.C. § 119(a) the benefit of Korean Patent Application No. 10-2017-0171033, filed on Dec. 13, 2017, the entire contents of which are incorporated herein by reference.

BACKGROUND

(a) Technical Field

The present disclosure relates to an apparatus for mounting a vehicle roof rack, more particularly, to the apparatus for mounting the vehicle roof rack that is capable of reducing the cost of production and improving the external appearance of the vehicle roof rack with a simple structure.

(b) Description of Related Art

In general, roof moldings are provided on the roof of a passenger vehicle to prevent the exposure of welds between a roof panel and side panels to the outside, and these roof moldings are also referred to as roof carriers. Additionally, roof racks may also be mounted to load the roof panel of the vehicle with a variety of goods.

In order to resolve inconvenience due to a small interior space when loads or objects are stored within the vehicle, the roof carriers may be mounted on the roof panel of the vehicle to load other goods as well as objects for leisure sports.

Meanwhile, the roof racks are bar-shaped fixed devices arranged at both sides of the roof of the vehicle. The vehicle has a limited load capacity due to space constraints in the interior space and trunk of the vehicle. In this case, the roof is loaded with goods using the roof racks and the goods are supported by a cross bar connecting the roof racks. The cross bar crosses the upper surface of the roof and slides between the roof racks.

FIG. 1 (RELATED ART) is a view schematically illustrating a conventional apparatus for mounting a vehicle roof rack.

Referring to FIG. 1, the conventional apparatus for mounting a vehicle roof rack includes a mounting part that is formed in the lower portion of a roof rack 2 to mount the roof rack 2 to a roof panel mounting portion 1A formed in a vehicle roof panel 1, a fastener 20 that is coupled to the mounting part and is secured to the roof panel 1, a roof rack fixing member 30 that is coupled to the mounting part and the fastener 20, spacers that are provided above and beneath the roof rack fixing member 30, a roof pad 40 that is coupled to the lower portion of the roof rack 2, and a roof rack support member that is coupled to the roof rack 2.

The roof panel mounting portion 1A formed in the roof panel 1 is recessed from the surface of the roof panel 1 by a certain depth. The roof panel mounting portion 1A has a through-hole 1B formed in the bottom thereof so that a fixed portion 24 of the fastener 20 may pass through the through-hole 1B. In this case, the number of through-holes 1B corresponds to the number of fasteners 20 and the through-holes 1B are longitudinally spaced at regular intervals on the bottom of the roof panel 1.

The roof rack 2 has an insertion hole 12 formed in the lower portion thereof so that an insertion portion 22 of the fastener 20 may be inserted into the insertion hole 12. In this case, the number of insertion holes 12 corresponds to the number of fasteners 20 and the insertion holes 12 are spaced at regular intervals in the longitudinal direction of the roof rack 2.

The roof rack 2 has an opening formed at one side of the lower portion thereof, and the opening is a slot that is open longitudinally and has a certain width. The opening provides a space into which a first hook 36 of the roof rack fixing member 30 and a second hook of the roof pad 40 are inserted.

However, since the conventional roof rack is inconvenient in its use due to a complicated installation structure and needs parts such as brackets and temporary clips during installation, there is a problem in that the cost of production and the cost of manufacture are increased. Moreover, there is a problem in that rainwater enters the interior or the external appearance of the roof rack is deformed.

SUMMARY

An embodiment of the present disclosure is directed to an apparatus for mounting a vehicle roof rack, which is capable of reducing the cost of manufacture by reducing the number of constituent parts of a roof rack and simplifying an installation process, and of improving the external appearance of the roof rack by preventing rainwater from entering the interior and preventing deformation of the external appearance.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, an apparatus for mounting a vehicle roof rack is provided on a roof of a vehicle and includes a roof rack rail, a roof rack bolt fixed to the roof rack rail, a roof rack nut fastened to the roof rack bolt, a roof rack pad coupled to the roof rack rail, a spacer mounted to a roof panel of the vehicle, and an in-line nut for fixing the spacer.

The roof rack rail may have a roof rack bolt insertion portion formed in its lower portion.

The roof rack bolt insertion portion may be formed with a movement prevention portion to prevent movement of the roof rack bolt.

The roof rack rail may have tips formed to prevent rotation of the roof rack bolt.

The roof rack rail may have a coupling portion coupled to the roof rack pad.

The roof rack bolt may include a head, a first thread extending from the head, and a second thread extending from the first thread.

The first thread may have a greater diameter than the second thread.

The first thread may be fastened to the roof rack nut.

The second thread may be fastened to the in-line nut.

The roof rack bolt may be coupled to the roof rack bolt insertion portion formed in the roof rack rail by sliding.

The roof rack pad may have a spacer mounting hole formed for mounting the spacer.

The roof rack pad may have a first hook formed at its upper portion so that the first hook is coupled to the roof rack rail.

The roof rack pad may be fixed by the roof rack bolt and the roof rack nut.

The spacer may have a through-hole through which the roof rack bolt passes.

The spacer may have a second hook formed at its lower portion so that the second hook is fixed to a roof panel flange.

The spacer may have third hooks formed at both sides thereof so that the third hooks are coupled to the roof rack pad.

The spacer may have an inclined portion formed for drainage.

The spacer may have drains formed for drainage.

The drains may be formed at both sides of the inclined portion.

The spacer may be positioned between a roof panel flange and the roof rack pad.

The spacer may have a recess to which a butyl seal is seated.

The spacer may include a butyl seal for sealing.

The butyl seal may be pressed by the in-line nut.

DESCRIPTION OF SPECIFIC EMBODIMENTS

Figure 1:
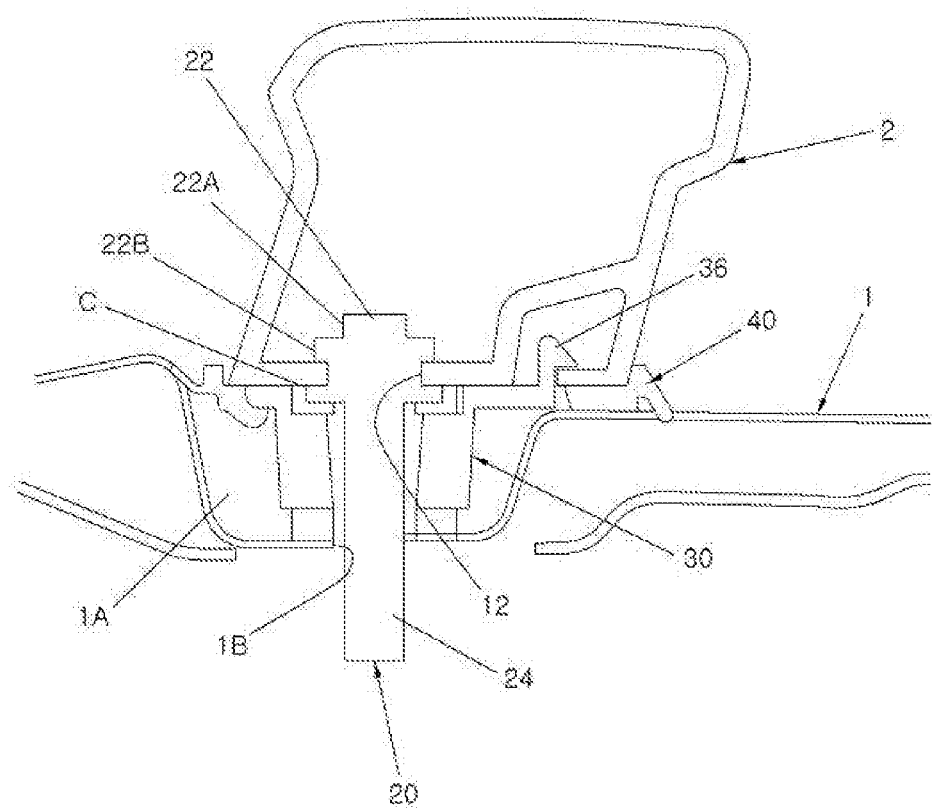
FIG. 1 (RELATED ART) is a view schematically illustrating a conventional apparatus for mounting a vehicle roof rack.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Exemplary embodiments to be described below are provided in order for those skilled in the art to easily understand the technical spirit of the present disclosure, and the present disclosure is not restricted by the embodiments. Furthermore, contents expressed in the accompanying drawings have been diagrammed to easily describe the embodiments of the present disclosure, and may be different from those that are actually implemented.

It will be understood that when an element is referred to as being "connected" to another element, it can be "directly connected" to the other element or it can be "indirectly connected" to the other element with other elements being interposed therebetween.

In addition, the terms "first" and "second" are used to only distinguish a plurality of elements from one another and do not limit the sequence or other characteristics of the elements.

Figure 2:
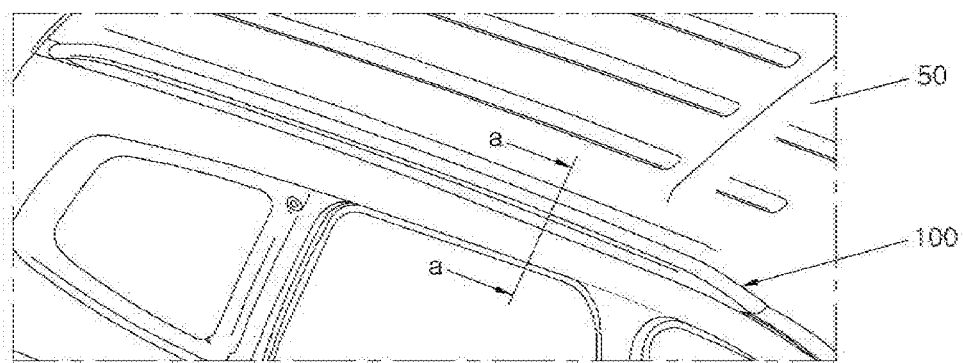
FIG. 2 is a view schematically illustrating an apparatus for mounting a vehicle roof rack according to an embodiment of the present disclosure.
Figure 3:
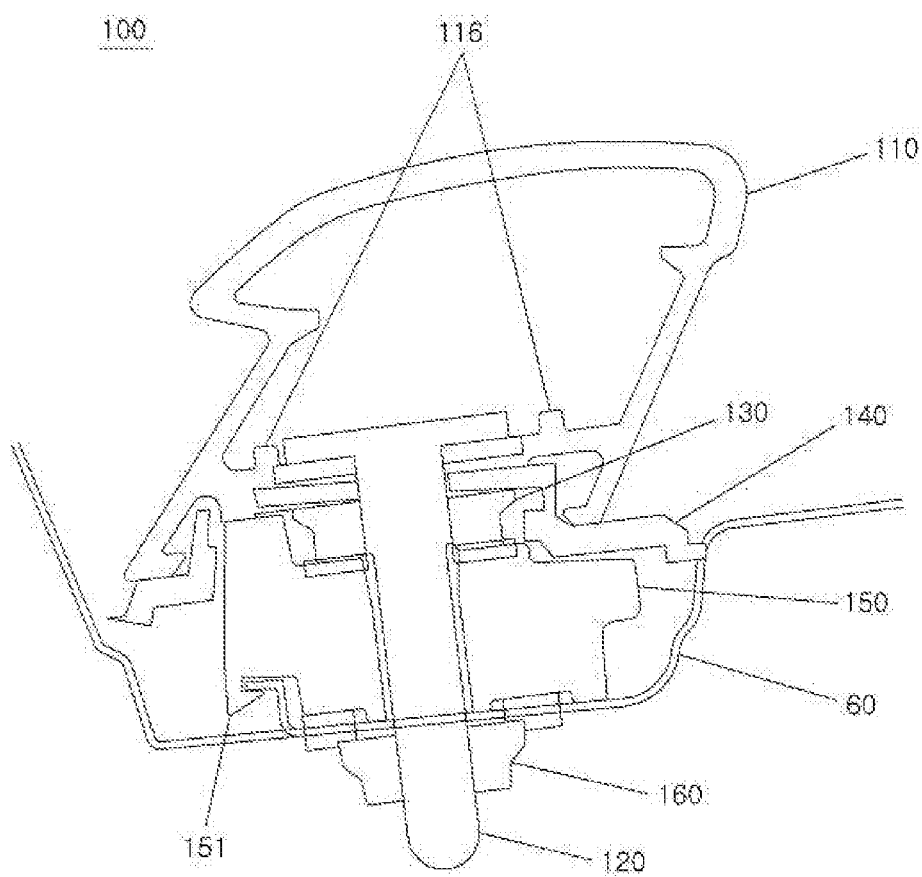
FIG. 3 is a cross-sectional view taken along line a-a of FIG. 2.
Figure 4:
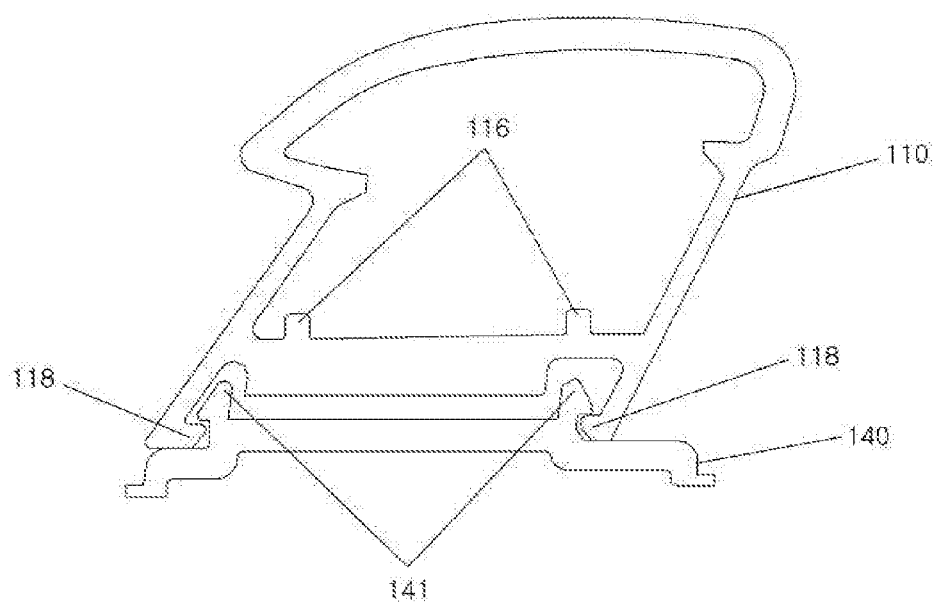
FIG. 4 is a cross-sectional view illustrating a roof rack pad of the apparatus for mounting a vehicle roof rack according to the embodiment of the present disclosure.

FIG. 2 is a view schematically illustrating an apparatus for mounting a vehicle roof rack according to an embodiment of the present disclosure. FIG. 3 is a cross-sectional view taken along line a-a of FIG. 2. FIG. 4 is a cross-sectional view illustrating a roof rack pad of the apparatus for mounting a vehicle roof rack according to the embodiment of the present disclosure.

Referring to FIGS. 2 to 4, the apparatus for mounting a vehicle roof rack, which is designated by reference numeral 100, is provided on a roof of a vehicle 50, and includes a roof rack rail 110, a roof rack bolt 120 that is fixed to the roof rack rail 110, a roof rack nut 130 that is fastened to the roof rack bolt 120, a roof rack pad 140 that is coupled to the roof rack rail 110, a spacer 150 that is mounted to a roof panel 60 of the vehicle, and an in-line nut 160 for fixing the spacer 150.

In a specific example, the roof rack pad 140 has a spacer mounting hole 143 (see FIG. 5) for mounting the spacer 150, and the spacer 150 has a bolt through-hole through which the roof rack bolt 120 passes.

In this structure, the roof rack rail 110 has a roof rack bolt insertion portion 112 (see FIG. 5) formed in the lower portion thereof, it has a has a pair of tips 116 spaced apart from each other to prevent the rotation of the roof rack bolt 120, and it has a coupling portion 118 that is coupled to the roof rack pad 140.

In addition, the roof rack pad 140 has a first hook 141 formed at the upper portion thereof so that the first hook 141 is coupled to the roof rack rail 110. The spacer 150 has a second hook 151 formed at the lower portion thereof so that the second hook 151 is fixed to a roof panel flange.

The roof rack pad 140 is fixed by the roof rack bolt 120 and the roof rack nut 130, and the spacer 150 is positioned between the roof panel flange and the roof rack pad 140. The fastening structure between the roof rack bolt 120 and the roof rack nut 130 and the coupling structure of the spacer 150 will be described below in detail.

In an entire cross-sectional structure taken along line a-a of the apparatus for mounting a vehicle roof rack according to the embodiment of the present disclosure, the roof rack rail 110 and the roof rack pad 140 coupled to the roof rack rail 110 are positioned in order from above, the spacer 150 is positioned beneath the roof rack pad 140, and the roof rack nut 130 fastened to the roof rack bolt 120 is positioned between the roof rack pad 140 and the spacer 150. The spacer 150 is disposed on the roof panel 60 of the vehicle, and the in-line nut 160 fastened to the roof rack bolt 120 is fastened to the lower portion of the roof panel 60 to fix the all components of the apparatus.

Figure 5:
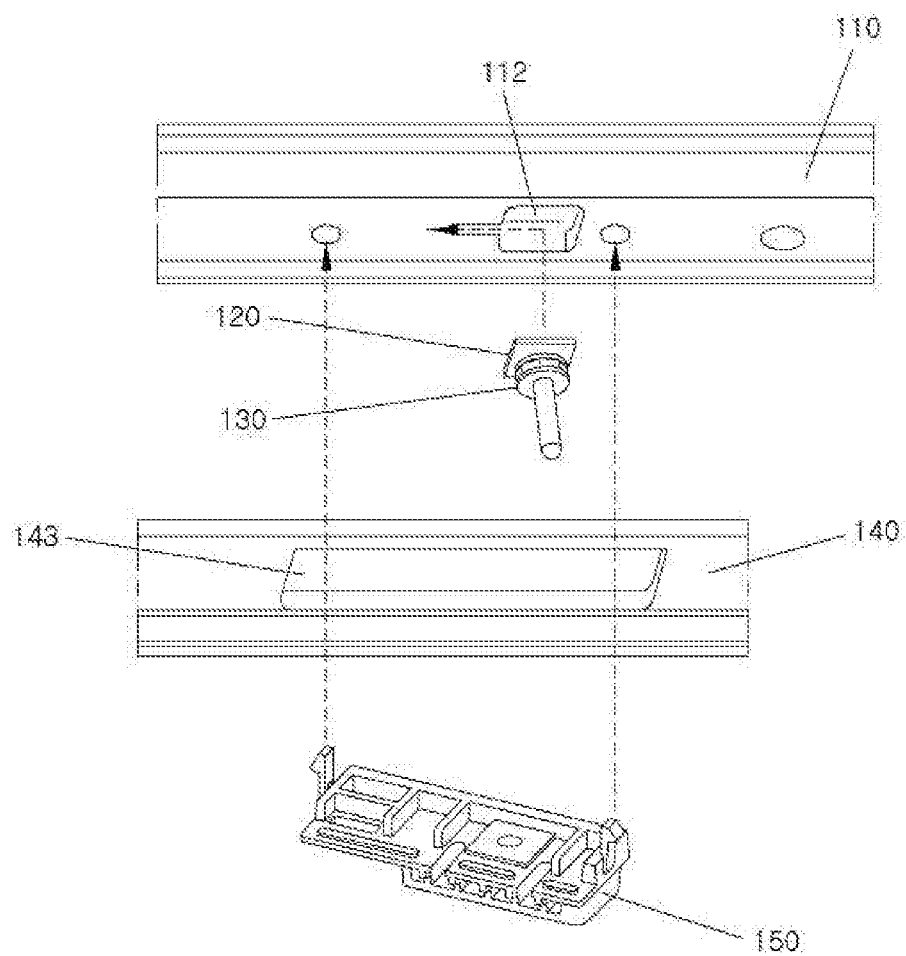
FIG. 5 is a view schematically illustrating the assembly of the apparatus for mounting a vehicle roof rack according to the embodiment of the present disclosure.
Figure 6:
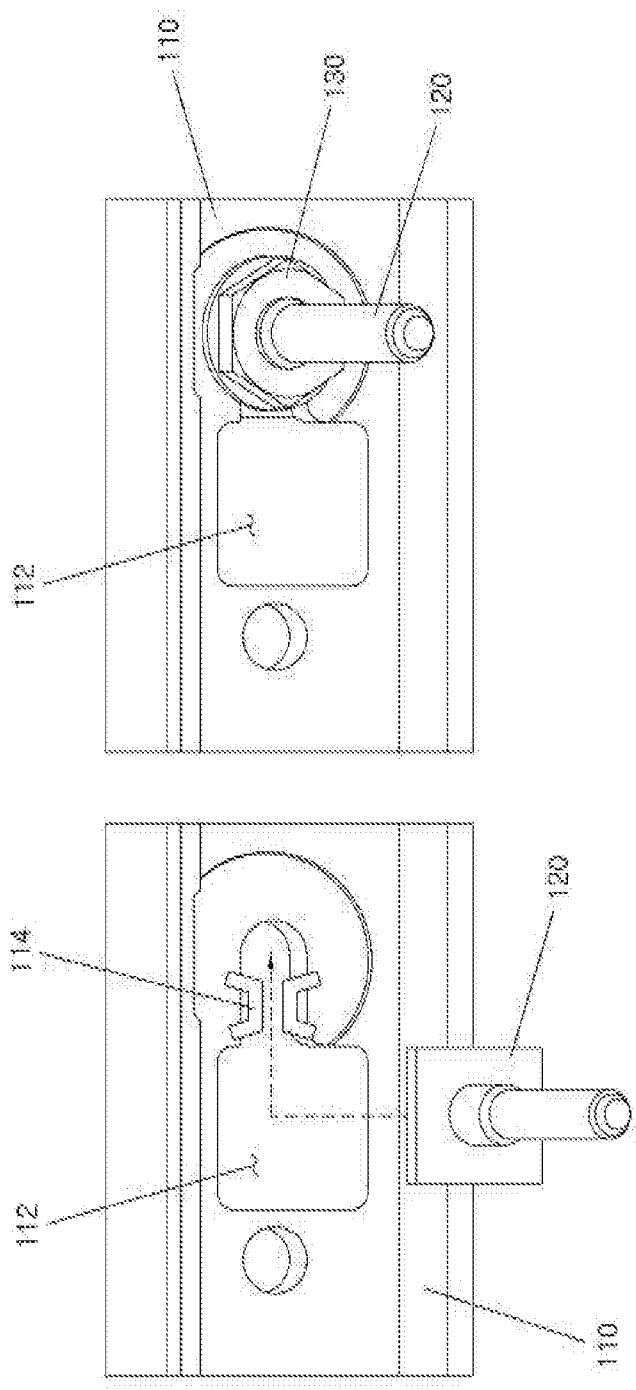
FIG. 6 is a view schematically illustrating the bolt assembly of the apparatus for mounting a vehicle roof rack according to the embodiment of the present disclosure.
Figure 7:
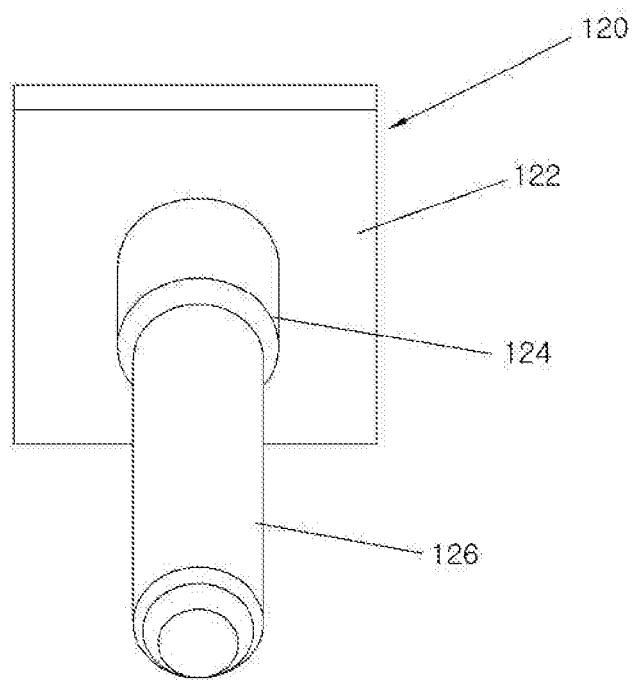
FIG. 7 is a view schematically illustrating a roof rack bolt of the apparatus for mounting a vehicle roof rack according to the embodiment of the present disclosure.

FIG. 5 is a view schematically illustrating the assembly of the apparatus for mounting a vehicle roof rack according to the embodiment of the present disclosure. FIG. 6 is a view schematically illustrating the bolt assembly of the apparatus for mounting a vehicle roof rack according to the embodiment of the present disclosure. FIG. 7 is a view schematically illustrating a roof rack bolt of the apparatus for mounting a vehicle roof rack according to the embodiment of the present disclosure.

FIGS. 5 to 7 illustrate the roof rack rail 110, the roof rack pad 140 coupled to the roof rack rail 110, and the spacer 150 mounted to the roof panel 60 of the vehicle.

In a specific example, the roof rack bolt insertion portion 112 is formed in the roof rack rail 110, and the roof rack bolt insertion portion 112 is formed with a movement prevention portion 114 to prevent the movement of the roof rack bolt 120. The roof rack bolt 120 is inserted into the roof rack bolt insertion portion 112 formed in the roof rack rail 110 and slides in one direction to be fixed by the movement prevention portion 114.

Here, the roof rack bolt 120 according to the embodiment of the present disclosure includes a head 122, a first thread 124 that extends from the head 122, and a second thread 126 that extends from the first thread 124.

In detail, the first thread 124 has a greater diameter than the second thread 126, the first thread 124 is fastened to the roof rack nut 130, and the second thread 126 is fastened to the in-line nut 160.

Figure 8:
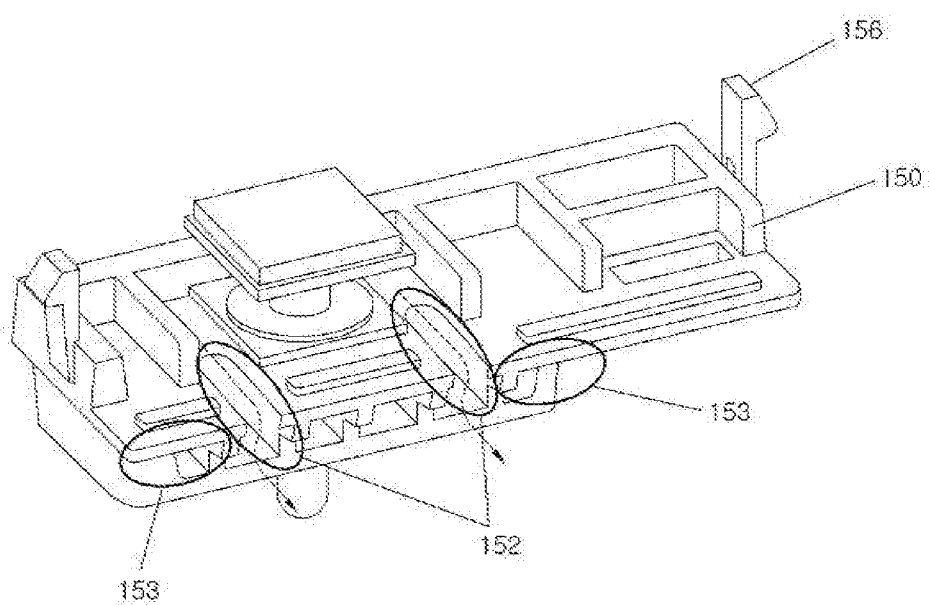
FIG. 8 is a view schematically illustrating a spacer of the apparatus for mounting a vehicle roof rack according to the embodiment of the present disclosure.
Figure 9:
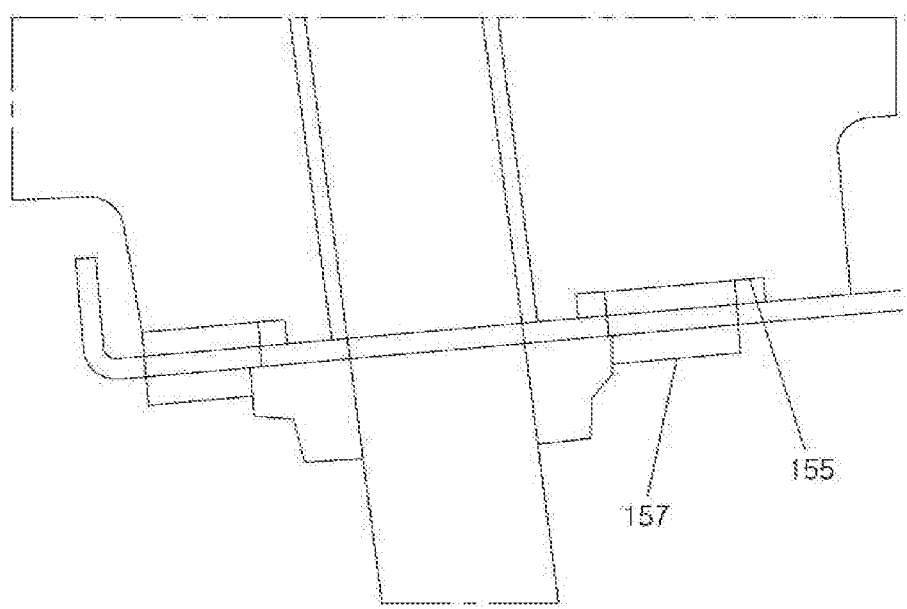
FIG. 9 is a view schematically illustrating a butyl seal of the apparatus for mounting a vehicle roof rack according to the embodiment of the present disclosure.

FIG. 8 is a view schematically illustrating a spacer of the apparatus for mounting a vehicle roof rack according to the embodiment of the present disclosure. FIG. 9 is a view schematically illustrating a butyl seal of the apparatus for mounting a vehicle roof rack according to the embodiment of the present disclosure.

Referring to FIGS. 8 and 9 together with FIG. 3, the spacer 150 according to the embodiment of the present disclosure has the through-hole so that the roof rack bolt 120 passes through the through-hole.

The second hook 151 is formed at the lower portion of the spacer 150 to be fixed to the roof panel flange, and the spacer 150 has third hooks 156 formed at both sides thereof so that the third hooks 156 are coupled to the roof rack pad 140.

The spacer 150 having this structure has an inclined portion 152 formed for drainage, and has drains 153 formed for drainage. The drains 153 are formed at both sides of the inclined portion 152 and communicate with the inclined portion 152 to prevent introduction of rainwater into the interior.

In addition, the spacer 150 further includes a butyl seal 157 for sealing, and has a recess 155 so that the butyl seal 157 is seated to the recess 155.

The operational relationship of the apparatus for mounting a vehicle roof rack according to the embodiment of the present disclosure will be described with reference to FIGS. 2 to 9. The roof rack bolt 120 is inserted into the roof rack bolt insertion portion 112 formed in the lower portion of the roof rack rail 110, slides toward the movement prevention portion 114, and is fixed to the roof rack rail 110 by the tips 116 preventing the rotation of the roof rack bolt 120.

When the roof rack bolt 120 is fixed to the roof rack rail 110, the roof rack nut 130 is fastened to the roof rack bolt 120. In this case, the roof rack nut 130 is fastened to the first thread 124 of the roof rack bolt 120 since the roof rack bolt 120 includes the head 122, the first thread 124 extending from the head 122, and the second thread 126 extending from the first thread 124.

Next, the spacer 150 is inserted into the spacer mounting hole 143 formed in the roof rack pad 140 so that the third hooks 156 are fastened to the roof rack rail 110, and the roof rack bolt 120 is fastened to the spacer 150 through the bolt through-hole formed in the spacer 150.

The spacer 150 includes the butyl seal 157 for sealing, and the butyl seal 157 is seated to the recess 155 formed in the spacer 150. In this case, the butyl seal 157 is positioned around the roof rack bolt 120.

In addition, since the second hook 151 fixed to the roof panel flange is formed outside the lower portion of the spacer 150, the spacer 150 is fixed by fastening the second hook 151 to the roof panel flange.

In this structure, the roof rack is fixed by fastening the second thread 126 of the roof rack bolt 120 to the in-line nut 160 within the vehicle.

Subsequently, the first hook 141 coupled to the roof rack rail 110 is formed at the upper portion of the roof rack pad 140, and the coupling portion 118 coupled to the roof rack pad 140 is formed at the roof rack rail 110. Thus, the roof rack rail 110 is coupled to the roof rack pad 140.

Accordingly, the apparatus for mounting a vehicle roof rack according to the present disclosure can reduce the cost of manufacture by reducing the number of parts and simplifying the installation process by improving the complicated structure of the roof rack, and can improve the external appearance of the roof rack by preventing the introduction of rainwater into the interior and preventing the deformation of the external appearance.

In accordance with exemplary embodiments of the present disclosure, an apparatus for mounting a vehicle roof rack can reduce the cost of manufacture by reducing the number of parts and simplifying an installation process by improving the complicated structure of a roof rack, and can improve the external appearance of the roof rack by preventing rainwater from entering the interior and preventing the deformation of the external appearance.

While the present disclosure has been particularly shown and described with reference to exemplary embodiments thereof, it will be understood by those skilled in the art that various changes in form and details may be made therein without departing from the spirit and scope of the disclosure as defined by the appended claims. The exemplary embodiments should be considered in descriptive sense only and not for purposes of limitation. Therefore, the scope of the disclosure is defined not by the detailed description of the disclosure but by the appended claims, and all differences within the scope will be construed as being included in the present disclosure. Furthermore, the terms and words used in the specification and claims should not be construed as their ordinary or dictionary sense. On the basis of the principle that the inventor can define the appropriate concept of a term in order to describe his/her own disclosure in the best way, it should be construed as meaning and concepts for complying with the technical idea of the present disclosure. In addition, processes described stepwise are not necessarily performed in time sequential order and when the spirit of the present disclosure is satisfied even though an order of performing each step is changed, the processes are included in the scope of the present disclosure.

What is claimed is:

1. An apparatus for mounting a vehicle roof rack, provided on a roof panel of a vehicle, the apparatus comprising:
   a roof rack rail;
   a roof rack pad coupled to the roof rack rail;
   a roof rack bolt fixed to the roof rack rail;
   a roof rack nut fastened to the roof rack bolt;
   a spacer mounted between the roof rack pad and the roof rack panel of the vehicle; and
   an in-line nut coupled to the roof rack bolt for fixing the spacer,
   wherein the roof rack pad is fixed by the roof rack bolt and the roof rack nut,
   wherein the in-line nut is fastened to the roof rack bolt which protrudes from a lower portion of the roof panel, and
   wherein the spacer further includes a recess at a lower portion thereof and a seal is seated to the recess, wherein the seal is positioned around the roof rack bolt and is pressed by the in-line nut.

2. The apparatus of claim 1, wherein the roof rack rail has a roof rack bolt insertion portion formed in its lower portion.

3. The apparatus of claim 2, wherein the roof rack bolt insertion portion is formed with a movement prevention portion to prevent movement of the roof rack bolt by fixing the roof rack bolt.

4. The apparatus of claim 1, wherein the roof rack rail has a pair of tips spaced apart from each other to prevent rotation of the roof rack bolt.

5. The apparatus of claim 1, wherein the roof rack rail has a coupling portion to be coupled to the roof rack pad.

6. The apparatus of claim 1, wherein the roof rack bolt comprises:
   a head;
   a first thread extending from the head; and
   a second thread extending from the first thread.

7. The apparatus of claim 6, wherein the first thread has a greater diameter than the second thread.

8. The apparatus of claim 6, wherein the first thread is fastened to the roof rack nut.

9. The apparatus of claim 6, wherein the second thread is fastened to the in-line nut.

10. The apparatus of claim 1, wherein the roof rack bolt is coupled to the roof rack bolt insertion portion formed in the roof rack rail by sliding and fixed to the roof rack rail.

11. The apparatus of claim 1, wherein the roof rack pad has a spacer mounting hole formed for mounting the spacer.

12. The apparatus of claim 1, wherein the roof rack pad has a first hook formed at its upper portion so that the first hook is coupled to the roof rack rail.

13. The apparatus of claim 1, wherein the spacer has a through-hole through which the roof rack bolt passes.

14. The apparatus of claim 1, wherein the spacer has a second hook formed at its lower portion so that the second hook is fixed to a roof panel flange.

15. The apparatus of claim 1, wherein the spacer has third hooks formed at both sides thereof so that the third hooks are coupled to the roof rack pad.

16. The apparatus of claim 1, wherein the spacer has an inclined portion formed for drainage.

17. The apparatus of claim 16, wherein drains are formed at both sides of the inclined portion of the spacer.

18. The apparatus of claim 1, wherein the spacer is positioned between a roof panel flange and the roof rack pad.

19. The apparatus of claim 1, wherein the seal is a butyl seal for sealing.

20. The apparatus of claim 1, wherein the spacer is positioned beneath the roof rack pad and the roof rack nut is positioned between the roof rack pad and the spacer, and wherein the in-line nut fastened to the roof rack bolt is fastened to the lower portion of the roof panel.

* * * * *